(12) United States Patent
Wang et al.

(10) Patent No.: US 12,147,265 B2
(45) Date of Patent: Nov. 19, 2024

(54) AVOID REDUCED EFFECTIVE BANDWIDTH ON TRANSMISSION LINES IN THE PRESENCE OF CLOCK DOMAIN DIFFERENCES

(71) Applicant: ATI Technologies ULC, Markham (CA)

(72) Inventors: Yanfeng Wang, Markham (CA); Shaofeng An, Markham (CA)

(73) Assignee: ATI Technologies ULC, Markham (CA)

( * ) Notice: Subject to any disclaimer, the term of this patent is extended or adjusted under 35 U.S.C. 154(b) by 173 days.

(21) Appl. No.: 18/057,710

(22) Filed: Nov. 21, 2022

(65) Prior Publication Data

US 2024/0168515 A1    May 23, 2024

(51) Int. Cl.
G06F 1/12   (2006.01)
G06F 1/08   (2006.01)

(52) U.S. Cl.
CPC . *G06F 1/12* (2013.01); *G06F 1/08* (2013.01)

(58) Field of Classification Search
CPC ..................................... G06F 1/12; G06F 1/08
See application file for complete search history.

(56) References Cited

U.S. PATENT DOCUMENTS

| | | | |
|---|---|---|---|
| 6,798,783 B1 * | 9/2004 | Rangarajan | H04L 12/5601 370/535 |
| 7,082,584 B2 | 7/2006 | Lahner et al. | |
| 7,243,322 B1 | 7/2007 | Ly et al. | |
| 7,289,946 B1 | 10/2007 | Lee | |
| 7,362,771 B1 * | 4/2008 | Lo | H04L 49/9031 710/52 |
| 7,451,338 B2 | 11/2008 | Lemos | |
| 7,779,286 B1 | 8/2010 | Pritchard et al. | |
| 7,853,912 B2 | 12/2010 | Binder et al. | |
| 8,401,138 B2 * | 3/2013 | Hayasaka | H04L 7/042 713/503 |
| 8,584,067 B2 * | 11/2013 | Osborn | G06F 30/20 716/135 |
| 8,788,826 B1 * | 7/2014 | Zhao | H04L 61/5007 713/162 |
| 2005/0268265 A1 | 12/2005 | Ly et al. | |
| 2006/0282251 A1 | 12/2006 | Schuppe | |
| 2007/0129923 A1 | 6/2007 | Langer et al. | |
| 2007/0130492 A1 | 6/2007 | Jamkhandi | |

(Continued)

*Primary Examiner* — Zahid Choudhury
(74) *Attorney, Agent, or Firm* — Kowert, Hood, Munyon, Rankin & Goetzel, P.C.; Rory D. Rankin (57) ABSTRACT

An apparatus and method for efficiently routing power signals across a semiconductor die. In various implementations, a computing system includes transmitters sending data signals to receivers that support using a prefix to provide clock recovery and alignment of the input bit stream that arrives at the receivers. Based on when a decoder of a receiver receives the prefixes, the decoder determines which clock cycles to skip writing data into a buffer of data processing circuitry. Therefore, the decoder prevents overflow of this buffer when the rate of insertion is greater than the rate of removal for this buffer. In contrast, the transmitter continues to send data during each clock cycle, and accordingly, avoids reducing the effective bandwidth on transmission lines in the presence of clock domain differences between transmitter and receiver.

20 Claims, 8 Drawing Sheets

(56) References Cited

U.S. PATENT DOCUMENTS

2008/0313589 A1* 12/2008 Maixner ............... G06F 30/331
                                                      716/113
2009/0119630 A1   5/2009 Binder et al.
2011/0302460 A1  12/2011 Idgunji et al.
2018/0129470 A1*  5/2018 Giles ....................... G06F 9/526
2021/0391973 A1* 12/2021 Jeon ...................... H04L 7/0079

* cited by examiner

AVOID REDUCED EFFECTIVE BANDWIDTH ON TRANSMISSION LINES IN THE PRESENCE OF CLOCK DOMAIN DIFFERENCES

BACKGROUND

Description of the Relevant Art

When transferring information between functional blocks in a semiconductor chip, electrical signals are sent on multiple, parallel metal traces. High-speed networks and computer buses continue to increase demand for bandwidth. The increasing demand for high bandwidth interconnection causes the input/output (I/O) data rates to also increase as well as the number of data signals to transfer. Transmitters in a first functional block send the electrical signals across the parallel metal traces. Receivers in a second functional block receive the electrical signals. In some cases, the two functional blocks are within a same die. In other cases, the two functional blocks are on separate dies. In either case, the metal traces have transmission line effects such as distributed inductance, capacitance, and resistance throughout its length. For modern integrated circuits, the interconnect capacitance reduces signal integrity and signal transfer rate more so than gate capacitance of semiconductor devices.

The interconnect capacitance per unit length includes both sidewall fringing capacitance and cross-coupling capacitance. For example, the electromagnetic fields for the metal traces conducting signals and the return current on the ground plane create electrical interference, such as electromagnetic interference (EMI), on neighboring metal traces and on adjacent devices. As the operating voltage continues to decrease to reduce power consumption, the signal swing used for Boolean logic decreases as well as the noise margin.

In current high-speed platform and circuitry design, in order to reduce the EMI issue and simplify clock routing topology, one or more techniques are used such as SSC (spread spectrum clocking) and SRIS (Separate Reference Clock with Independent SSC). However, these techniques require that the receiver achieves clock synchronization with the transmitter that typically reduces the bandwidth. For example, these techniques require that the transmitter skip sending data during particular clock cycles so that the receiver does not have overflow of buffers occur causing data corruption. The insertion of stall cycles, though, reduces the achieved bandwidth and system performance.

In view of the above, efficient methods and systems for receiving information as signals in a computing system are desired.

While the invention is susceptible to various modifications and alternative forms, specific implementations are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the scope of the present invention as defined by the appended claims.

DETAILED DESCRIPTION

In the following description, numerous specific details are set forth to provide a thorough understanding of the present invention. However, one having ordinary skill in the art should recognize that the invention might be practiced without these specific details. In some instances, well-known circuits, structures, and techniques have not been shown in detail to avoid obscuring the present invention. Further, it will be appreciated that for simplicity and clarity of illustration, elements shown in the figures have not necessarily been drawn to scale. For example, the dimensions of some of the elements are exaggerated relative to other elements.

Various systems, apparatuses, and methods for receiving information as signals in a computing system are disclosed. In various implementations, a computing system includes one or more functional blocks for processing applications. Examples of the functional blocks include a general-purpose central processing unit (CPU), a graphics processing unit (GPU), an accelerated processing unit (APU), a variety of input/output (I/O) devices, a memory controller for system memory, and so forth. The computing system also includes multiple interfaces for transferring data between the functional blocks. In some cases, two functional blocks transferring data between one another are within a same die. In other cases, the two functional blocks are on separate dies.

When transferring information between functional blocks, electrical signals are sent on multiple, parallel metal traces. Transmitters in a first functional block send the electrical signals across the parallel metal traces. Receivers in a second functional block receive the electrical signals. A receiver front-end includes multiple components such as protection and sampling circuitry, deserializer circuitry, a decoder, and a buffer of data processing circuitry. The buffer of data processing circuitry stores data output by the decoder that is processed by the data processing circuitry. The serial communication supports one of a variety of encoding techniques that adding prefix information (or a prefix) to data. Examples of encoding techniques that use prefix information include the 64b/66b encoding of the IEEE 802.3ae-2002 standard, the 8b/10b encoding of generations 1-2 of the PCIe standard, and the 128b-130b of generations 3-5 of the PCIe standard. Such approaches may provide for clock recovery and alignment of an input bit stream that arrives at the receivers.

The decoder receives a parallel data word (or data word) from the deserializer circuitry. Based on when the decoder receives the prefixes, the decoder determines which clock cycles to skip, or prevent, writing data into the buffer of data processing circuitry while the transmitter does not skip sending data in any clock cycle. Therefore, the decoder prevents overflow of this buffer when the rate of insertion is greater than the rate of removal for this buffer. The rates can be different due to the decoder using a clock domain different from a clock domain of the data processing circuitry. The transmitter continues to send data during each clock cycle, and accordingly, avoids reducing the effective bandwidth on transmission lines in the presence of clock domain differences between transmitter and receiver. Further details of the receiver front-end circuitry are provided in the following discussion and description of FIGS. 1-8.

Figure 1:
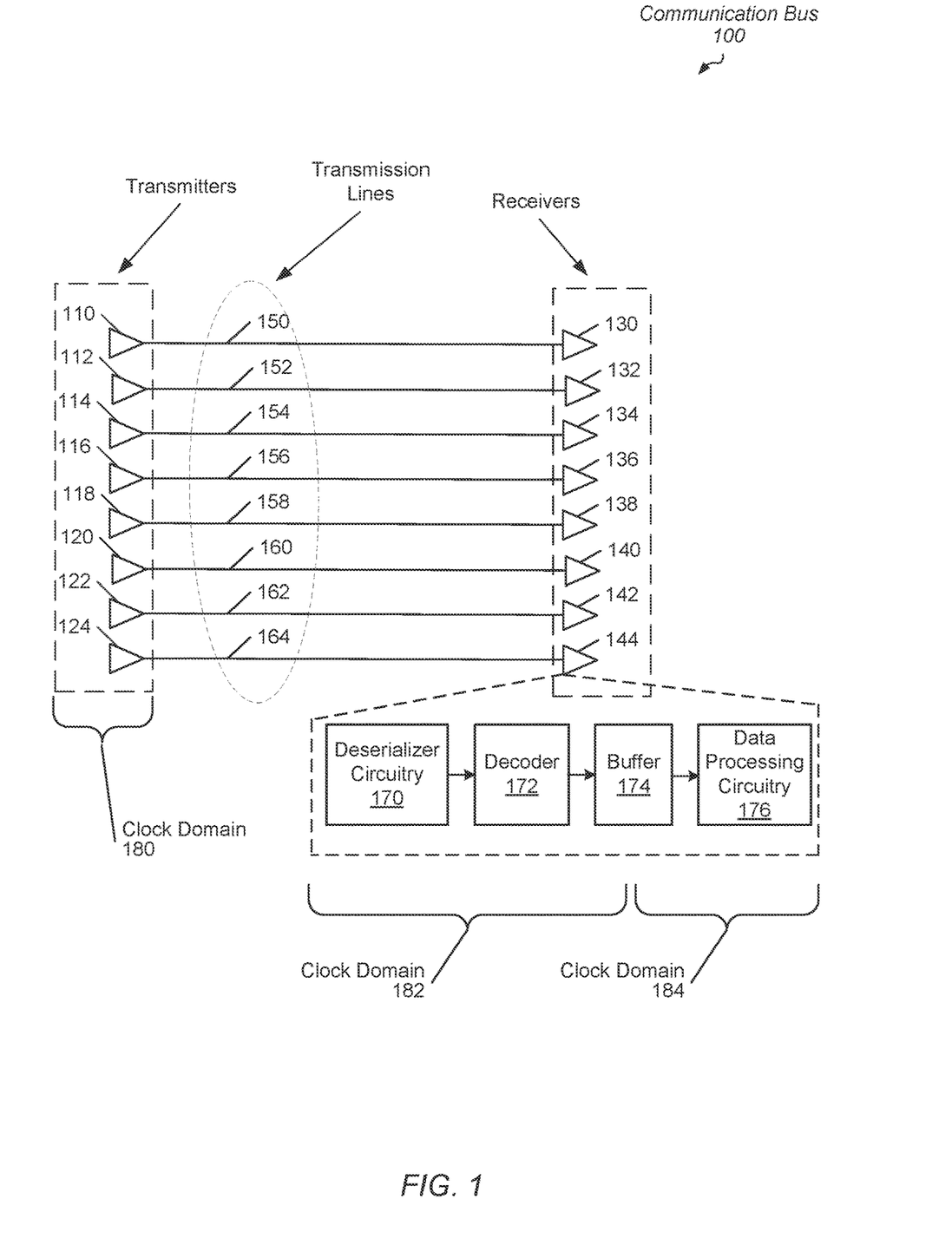
FIG. 1 is a generalized diagram of a communication bus that avoids reducing the effective bandwidth on transmission lines in the presence of clock domain differences between transmitter and receiver.

Referring to FIG. 1, a generalized block diagram is shown of a communication bus 100 that avoids reducing the effective bandwidth on transmission lines in the presence of clock domain differences between transmitter and receiver. As shown, communication bus 100 includes transmitters 110-124 for sending information as electrical signals, transmission lines 150-164 for transferring the electrical signals, and receivers 130-144 for receiving the signals. In various implementations, one or more of the receivers 130-144 include signal deserializer circuitry 170, a decoder 172 and a buffer 174 for storing decoded data that is to be sent to data processing circuitry of a functional block that includes the receivers 130-144. The directions of the transmitter currents on transmission lines 150-164 are based on whether the transmission lines 150-164 are being charged to logic high values or discharged to logic low values. In other words, the direct current (DC) patterns on the transmission lines 150-164 vary over time.

It is noted that the term "bus" can also be referred to as a "channel" or a "link," and each "transmission line" is a "lane" or a "trace" or a "wire." In various implementations, transmission lines 150-164 are constructed from a variety of suitable metal sources during semiconductor fabrication and surrounded by a variety of any suitable insulating material. It is also noted that the terms "pin," "port," "terminal," and "node" are used interchangeably herein. Although eight transmitters 110-124, eight transmission lines 150-164 and eight receivers 130-144 are shown, in other implementations, any number of these components is used.

In some implementations, the signals sent from transmitters 110-124 to receivers 130-144 are single-ended data signals. The term "single-ended signal" is defined as an electric signal which is transmitted using a single signal conductor. For example, in an implementation, receiver 130 receives a single-ended signal from transmitter 110 via transmission line 150, which is a single signal conductor. In contrast to using single-ended data signals, sending information with differential data signals uses more lines and more pins. A reference signal is not used by the receivers 130-144 when differential data signals are used. As is known in the art, differential signaling generally provides better noise immunity than single-ended signaling. However, the use of differential signaling comes at the added cost of extra pins and extra traces.

The transmitters 110-124 use a different power domain than a power domain used by the receivers 130-144. Therefore, the hardware, such as circuitry of the transmitters 130-144 use a different power supply than the circuitry of the receivers 130-144. Power supply variations, cross-coupling capacitance, and so forth cause variations in the electrical signals transported across the transmission lines 150-164. In addition to the deserializer circuitry 170, one or more of the receivers 130-144 utilize protection circuitry and signal reconstruction circuitry that includes an integrated capacitor. Particular data patterns that utilize a nearly same number of Boolean logic high values as a number of Boolean logic low values are sent on the transmission lines 150-164. These particular data patterns maintain a desired voltage level on the integrating capacitor of the receivers 130-144.

Therefore, one or more of the transmitters 110-124 use an encoder (not shown) that converts (or encodes or scrambles or maps) portions of data into data words that represent the portions of data. In some implementations, to convert the portions of data into data words, the circuitry of the transmitters 110-124 use a self-synchronous function such as a linear-feedback shift register (LFSR).

The above data conversion does not encrypt the payload data, but rather the data conversion provides a near even distribution of Boolean logic high values and Boolean logic low values being transmitted on the transmission lines 150-164. In some implementations, a size of a portion of payload data has a same size as a corresponding data word. In other implementations, the size of the data word is greater than the size of the portion of payload data. In addition to using different power domains, the transmitters 110-124 and the receivers 130-144 use different clock domains. As shown, the transmitters 110-124 use the clock domain 180, and each of the receivers use at least a clock domain 182 and a clock domain 184.

The deserializer circuitry 170 and the decoder 172 use the clock domain 182. The decoder 172 writes data into the buffer 174 using the clock domain 182. The data processing circuitry 176 reads data from the buffer 174 and processes data using the clock domain 184. With different clock generating circuitry providing clock signals in the different clock domains 180, 182 and 184, differences are present in clock frequencies and edges between one or more of these clock domains 180, 182 and 184. In addition to handling power supply variations, converting portions of payload data to data words that includes a near even distribution of Boolean logic high values and Boolean logic low values being transmitted on the transmission lines 150-164 provides clock recovery and alignment of the input bit stream that arrives at the receivers 130-144.

In addition to the conversion of the portions of payload data to data words, the circuitry of one or more of the transmitters 110-124 also inserts prefix information into the input bit stream. This prefix information is also referred to as preamble information. Each value of prefix information provides an indication of the data format of a corresponding section of data. For example, when a 2-bit prefix has a value 2'b01, the entire corresponding section of data stores payload data. Here, the indication "2'b" indicates 2 binary values or digits, or 2 bits. In some designs, the size of the corresponding section of data is 128 bits, and each portion of payload data has a size of 8 bits. Each of the sizes of the portions of payload data, the prefix, and the corresponding section of data can vary based on design requirements.

In another example, when the 2-bit prefix has a value 2'b10, the 128 bits of the corresponding section of data includes a first field that is a type field with size of one byte (8 bits) and a second field that stores 7 bytes (56 bits) of payload data or control and/or status information depending on the value stored in the first field. In various implementations, regardless of the size of the prefix, each of the available prefix values has at least one transition in Boolean logic values to ensure clock synchronization can occur. Examples of encoding techniques that use prefixes are the 64b/66b encoding of the IEEE 802.3ae-2002 standard, the 8b/10b encoding of generations 1-2 of the PCI Express (Peripheral Component Interconnect Express) standard, and the 128b-130b of generations 3-5 of the PCIe standard. It is noted that the term "encoding" as used here does not refer to data compression. Rather, the term "encoding" refers to using a technique, such as the listed examples, that transforms a section of payload data to another format that includes prefix information. Therefore, the section of payload data is expanded, rather than compressed.

Due to the differences between the clock domains 180, 182 and 184, the rate of inserting data in the buffer 174 can be faster than the rate of removing data from the buffer 174. This difference in rates can cause overflow in the buffer 174 and corresponding data corruption in one or more entries of the buffer 174. To avoid overflow without reducing the bandwidth on the transmission lines 150-164, the decoder 172 temporarily stores the prefix when the decoder 172 receives the prefix in a data word. The decoder 172 also temporarily stores the remaining portion of the data word, which the decoder 172 will concatenate with other bits of a subsequent data word. The components of the decoder 172 that perform these steps are further described in the description of the receiver front-end (of FIG. 2), and the steps are described in the description of the data flow 300 (of FIG. 3), and the methods 400-600 (of FIGS. 4-6).

Figure 2:
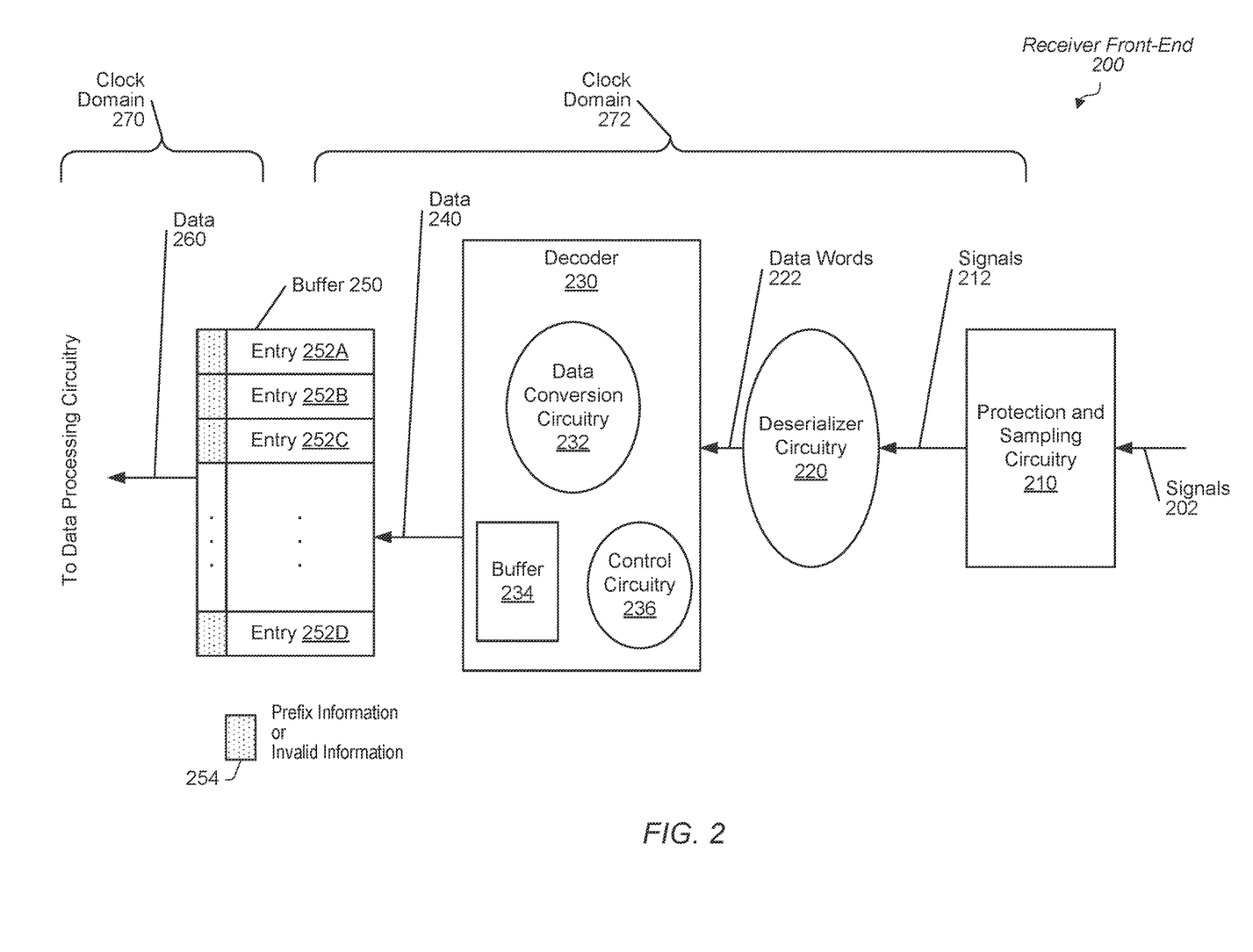
FIG. 2 is a generalized block diagram of a receiver front-end that avoids reducing the effective bandwidth on transmission lines in the presence of clock domain differences between transmitter and receiver.

Turning now to FIG. 2, a generalized block diagram is shown of a receiver front-end 200 that avoids reducing the effective bandwidth on transmission lines in the presence of clock domain differences between transmitter and receiver. In the illustrated implementation, receiver front-end 200 includes protection and sampling circuitry 210, deserializer circuitry 220, decoder 230, and buffer 250. The protection and sampling circuitry 210 (or circuitry 210) receives signals 202. The circuitry 210 includes electrostatic discharge (ESD) protection circuitry that uses clamping circuits such as diodes in a series configuration. The range of voltages of the signals 212 does not exceed the power supply voltage by more than a threshold voltage of a transistor and does not fall below the ground reference voltage by more than a threshold voltage of a transistor.

The circuitry 210 includes sampling circuitry that compares the electrical signals received on transmission lines on a bit-wise basis to a reference voltage. The results of the comparisons are used to determine whether a received electrical signal on a particular transmission line is a Boolean logic high value or a Boolean logic low value. The deserializer circuitry 220 receives the signals 212 and generates the data words 222. The deserializer circuitry 220 generates a sequence of parallel data words 222 (or data words 222) from the serialized data of the signals 212, and sends the parallel data words 222 to the decoder 230.

The decoder 230 converts the parallel data words 222 to the parallel payload data 240 (or data 240). A parallel payload data word of the data 240 generated by the decoder 230 matches the parallel payload data word generated by a source that transmitted data across transmission lines to the receiver front-end 200. The data conversion circuitry 232 performs this data conversion. The decoder 230 includes control circuitry 236 that determines whether a parallel data word 222 includes prefix information. In some implementations, the control circuitry 236 performs this determination based on knowledge of the size of the prefix information, the size of the parallel data words 222, and the size of section of data that include multiple parallel data words. Knowledge of these sizes allows the control circuitry 236 to predict which clock cycle a received parallel data word should include prefix information. In some implementations, the size of the prefix information is 2 bits, the size of the parallel data words is 8 bits, and the size of the sections of data is 128 bits. Therefore, when an 8-bit parallel data word is reconstructed by the deserializer circuitry 220 each clock cycle, the control circuitry 236 is able to predict that a parallel data word includes a 2-bit prefix every 16 clock cycles. A 2-bit prefix is received in clock cycle 0, a parallel data word includes a 2-bit data word in clock cycle 17, another parallel data word includes a 2-bit data word in clock cycle 33, and so on.

If a received parallel data word includes prefix information, the control circuitry 236 directs the decoder 230 to store at least the prefix information (or prefix) in the local buffer 234 (or buffer 234). The buffer 234 is implemented with one of flip-flop circuits, a random-access memory (RAM), a content addressable memory (CAM), or other. In some implementations, the control circuitry 236 also directs the decoder 230 to store, in the buffer 234, at least a portion of a converted version of the received parallel data word 222. In addition, the control circuitry 236 directs the decoder 230 to concatenate another portion of the parallel data word 222 with a copy of a portion of another parallel data word received in an immediately prior clock cycle. This copy of the portion of another parallel data word is stored in the buffer 234. The concatenation of the two portions creates a whole parallel data word to send as data 240 to the buffer 250.

Similar to the buffer 234, the buffer 250 is implemented with one of flip-flop circuits, a random-access memory (RAM), a content addressable memory (CAM), or other. The buffer 250 includes entries 252A-252D for storing parallel data words of data 240 received from the decoder 230. The buffer 250 also includes extra data storage 254 for storing a prefix although most parallel data words do not include a prefix. In an implementation, the size of the prefix information is 2 bits and the size of the parallel data words is 8 bits. In such an implementation, the size of each of the entries 252A-252D is 8 bits, and the size of the extra data storage 254 per entry is 2 bits. The extra data storage 254 only occasionally stores valid data. Therefore, the buffer 250 is made larger (wider) while not being fully utilized. The tradeoff is the transmitter sending data to the receiver front-end 200 does not need to insert stalls or skip inserting valid data in any clock cycle in order to avoid overflow of buffer 250 due to differences between clock domains.

Due to differences between the clock domains 270 and 272, the rate of inserting data in the buffer 250 can be faster than the rate of removing data from the buffer 272. This difference in the rate of data insertion into the buffer 250 and the rate of data removal from the buffer 250 can cause overflow in the buffer 250. Any overflow in the buffer 250 includes corresponding data corruption in one or more entries 252A-252D of the buffer 250. To avoid overflow without reducing the bandwidth on the transmission lines that transport the signals 202, the decoder 230 temporarily stores in the buffer 234 at least the prefix when the decoder 230 receives the prefix in a parallel data word. Additionally, the decoder 230 temporarily stores in the buffer 234 a portion, or a subset, of a recently received parallel data word. Further, the decoder 230 generates a parallel data word by concatenating another portion of the recently received parallel data word with a portion of a separate, previously received parallel data word, and sends this generated data word to the buffer 250. These steps to avoid overflow of the buffer 250 are further described in the description of the data flow 300 (of FIG. 3), and the methods 400-600 (of FIGS. 4-6).

Figure 3:
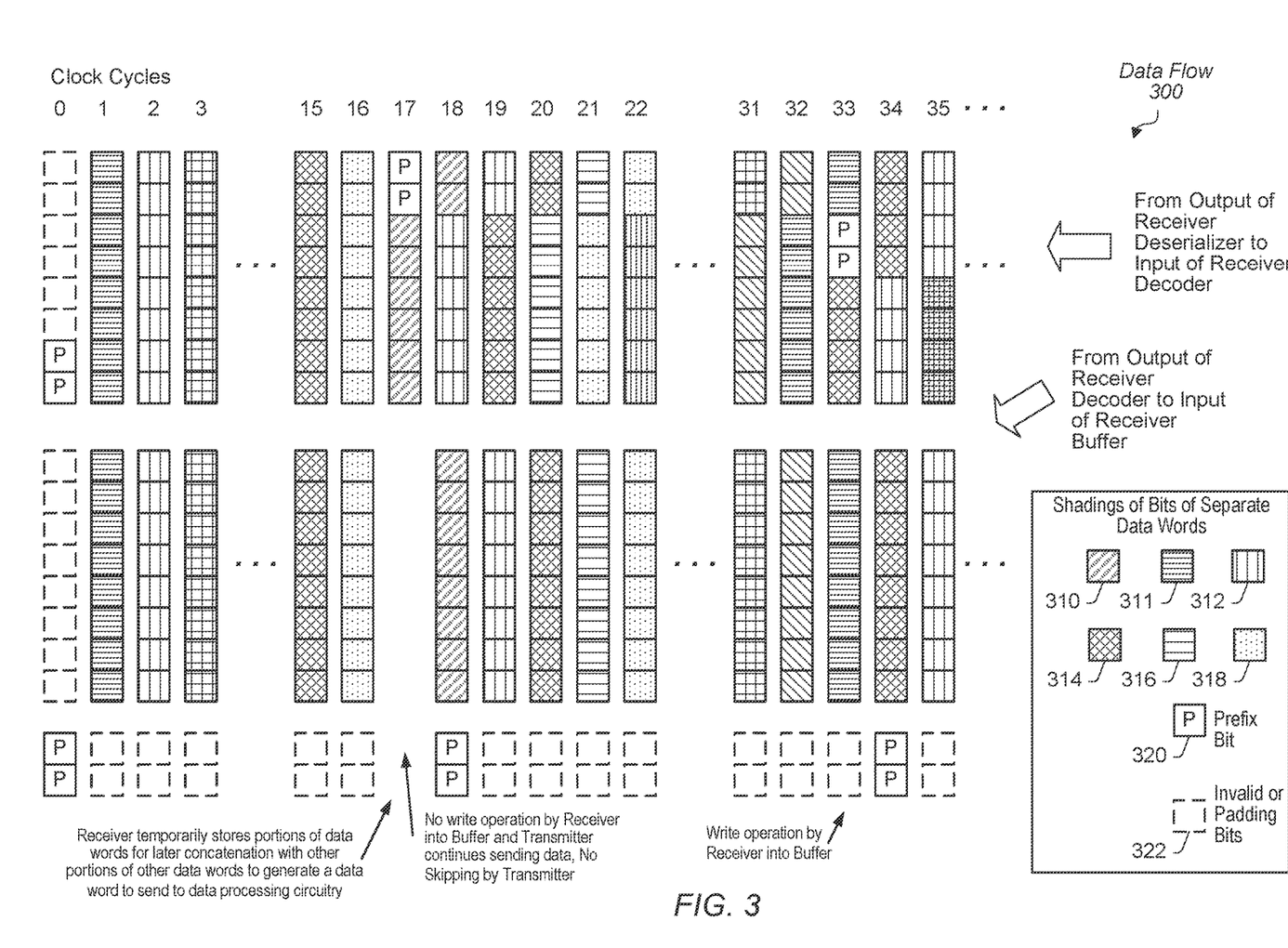
FIG. 3 is a generalized block diagram of a data flow provided by circuitry that avoids reducing the effective bandwidth on transmission lines in the presence of clock domain differences between transmitter and receiver.

Referring to FIG. 3, a generalized block diagram is shown of a data flow 300 provided by circuitry that avoids reducing the effective bandwidth on transmission lines in the presence of clock domain differences between transmitter and receiver. In the illustrated implementation, the top of FIG. 3 shows parallel data words (or data words) generated by deserializer circuitry of a receiver and sent as input data to a decoder of the receiver. The bottom of FIG. 3 shows these data words reorganized by the decoder prior to converting the data words from a first data format to a second data format, and sending the data words to a buffer of data processing circuitry. The first data format is a format that provides a near even distribution of Boolean logic high values and Boolean logic low values being transmitted on transmission lines. The second data format provides data words that match the data word generated by a source that transmitted data across transmission lines to the receiver. Examples of the source are a CPU, a GPU, a DSP, an ADC, one of a variety of types of an ASIC, a Hub used for communicating with multimedia engine, a display controller or other type of I/O controller, and so forth.

In the example shown in FIG. 3, large packets are divided into 128-bit sections of data that are sent with serial communication using 128b/130b encoding with 2-bit prefix information. The 128-bit second of data is sent as 8-bit data words per clock cycle, and so, 17 clock cycles are required to send the 128 bits of the second of data and the 2 bits of the prefix. Such communication was described earlier regarding the communication bus 100 (of FIG. 1) and the receiver front-end 200 (of FIG. 2). A first 128-bit section of data is sent during clock cycles (CCs) 0 to 16. A second 128-bit section of data is sent during CCs 17 to 33. A third 128-bit section of data is sent during CCs 33 to 49 (CC 49 is not shown), and so on.

In one implementation, in CC 0, the 2-bit prefix of the first 128-bit section of data is received by the decoder. These prefix bits are shown as prefix bits 320. The other 6 bits of the 8-bit data words are invalid or padding bits, which are shown as bits 322. The decoder sends the prefix bits to data conversion circuitry prior to the buffer of data processing circuitry. In some implementations, the decoder converts the data (payload data, header information, control, and status information) of the data words, but the decoder does not convert the prefix prior to sending data to the buffer of data processing circuitry. Although the data flow 300 shows data being sent out from the decoder in a same clock cycle as a clock cycle that the decoder receives data from the deserializer circuitry, it is possible and contemplated that the decoder stores data in sequential elements of one or more pipeline stages prior to sending out the data from the decoder.

As shown, in an implementation, the decoder is capable of sending 10 bits to the buffer of data processing circuitry although the received data words have a size of 8 bits. Therefore, entries of the buffer of the data processing circuitry are larger than a size of the data words generated by the deserializer circuitry. The increase in size of the buffer entries and the interface between the decoder and the buffer avoids reducing the effective bandwidth on transmission lines in the presence of clock domain differences between transmitter and receiver.

As described earlier, the first 128-bit section of data is sent during clock cycles (CCs) 0 to 16 as 8-bit data words per clock cycle. Each of these 8-bit data words use the bit shadings 310-318. It is noted that the shadings serve to distinguish between data words. For example, shading 310 is used to show that six of eight bits of a data word are received in clock cycle 17, while the remaining two bits are received in clock cycle 18. The $9^{th}$ and $10^{th}$ bits of the interface between the decoder and the buffer of the data processing circuitry include the bit 322, which indicates an invalid bit or a padding bit. Referring again briefly to FIG. 2, in an implementation, the decoder 230 receives 8 bits of a data word 222 from the deserializer circuitry 220, but the decoder 230 sends 10 bits to the buffer 250 when a write operation is to be performed for the buffer 250.

In CC 17 of the data flow 300, the received 8-bit data word includes the 2-bit prefix of the second 128-bit section of data. This received 8-bit data word also includes 6 bits of the 128 bits of the first data word of a second 128-bit section of data. These six bits are shown with shading 310. It is noted that in CC 17 the decoder does not write any data into the buffer of the data processing circuitry. Rather, the decoder skips, or prevents, writing data into the buffer of data processing circuitry while the transmitter does not skip sending data in any clock cycle. The transmitter continues to send data to the receiver in each clock cycle, and thus, the transmitter avoids reducing the effective bandwidth on transmission lines in the presence of clock domain differences between transmitter and receiver. In CC 17, the decoder stores the received 2-bit prefix in a local buffer. The decoder also stores, in the local buffer, the 6 bits of the first 8-bit data word of the second 128-bit section of data.

In CC 18, the decoder receives the remaining 2 bits of the first 8-bit data word of the second 128-bit section of data. These 2 bits have the shading 310. The decoder concatenates these 2 bits with the 6 bits of the 8-bit data word that were previously stored in the local buffer in CC 17. In CC 18, the decoder also receives 6 bits of the next (second) 8-bit data word of the second 128-bit section of data. These 6 bits have the shading 312. In CC 18, after concatenating bits, the decoder sends the first 8-bit data word of the second 128-bit section of data to the data conversion circuitry. Each of the 8 bits of this first data word has the shading 310. The converted data is sent to the buffer of data processing circuitry. Additionally, in CC 18, the decoder sends, to the buffer of data processing circuitry, the 2-bit prefix that was previously stored in the local buffer in CC 17. Therefore, the decoder sends 10 bits to the buffer of data processing circuitry.

In CCs 19-32, the decoder continues to temporarily store portions of data words, such as the 6-bit portions, in a local buffer while concatenating 2 bits of a received data words with 6 bits of a data words received in an immediately prior clock cycle. These portions of data words and the resulting concatenation are illustrated with the shadings (fillings) of the bits 310-318. In CC 33, the received 8-bit data word includes the 2-bit prefix of the third 128-bit section of data. This received 8-bit data word also includes the remaining 2 bits of the last 8-bit data word of the second 128-bit section of data. These 2 bits have the shading 311. The decoder concatenates these 2 bits with the 6 bits of the last 8-bit data word that were previously stored in the local buffer in CC 32. These 6 bits have the shading 311. The decoder temporarily stores the 2-bit prefix in the local buffer of the decoder.

The decoder also temporarily stores, in the local buffer, 4 bits of the first 8-bit data word of the third 128-bit section of data. These 4 bits have the shading 314.

In CC 34, the decoder receives the remaining 4 bits of the first 8-bit data word of the third 128-bit section of data. These 4 bits have the shading 314. The decoder concatenates these 4 bits with the 4 bits of the 8-bit data word that were previously stored in the local buffer in CC 33. In CC 34, the decoder also receives 4 bits of the next (second) 8-bit data word of the third 128-bit section of data. These 4 bits have the shading 312. In CC 34, after concatenating bits, the decoder sends the first 8-bit data word of the third 128-bit section of data to the data conversion circuitry. Each of the 8 bits of this first data word has the shading 314. The converted data is sent to the buffer of data processing circuitry. Additionally, in CC 34, the decoder sends, to the buffer of data processing circuitry, the 2-bit prefix that was previously stored in the local buffer in CC 33. Therefore, the decoder sends 10 bits to the buffer of data processing circuitry. In CCs 35-49 (CCs 36-49 are not shown), the decoder continues to temporarily store portions of data words, such as the 4-bit portions, in a local buffer while concatenating 4 bits of a received data words with 4 bits of a data words received in an immediately prior clock cycle.

As the decoder of the receiver continues to receive more 128-bit sections of data with corresponding 2-bit prefix, the decoder continues the above steps. Using the above example and data sizes, in CCs 49, 65 and 81, the received 8-bit data word includes a 2-bit prefix. In CC 65, the 2-bit prefix is aligned with an end of the received 8-bit data word. Similar to CC 17, in CC 81, the 2-bit prefix is aligned with a start of the received 8-bit data word. Therefore, similar to CC 17, in CC 81, the decoder does not write any data into the buffer of the data processing circuitry. However, the transmitter continues to send data to the receiver in each clock cycle, and thus, the transmitter avoids reducing the effective bandwidth on transmission lines in the presence of clock domain differences between transmitter and receiver. The decoder skips, or prevents, writing in CC 81 (similar to not writing in CC 17) as the transmitter does not skip sending data in any clock cycle. In CC 81, the decoder stores the received 2-bit prefix in a local buffer. The decoder also stores, in the local buffer, the 6 bits of the first 8-bit data word of the next 128-bit section of data.

Using the above initial placement of the prefix in the first data word of the first 128-bit section of data, and sizes of the sections and data words, the decoder can determine which clock cycles the decoder receives a data word that includes a prefix based on a count of clock cycles. For example, even before the decoder receives any data, the decoder determines that data words received in clock cycles 0, 17, 33, 49, 65, 81 and so on, include a prefix. In the above example, the initial placement of the prefix in the first data word of the first 128-bit section of data is aligned with the end of the first data word. The offset of the prefix is 6 bits, since bit 0 is at the start of the first data word and bit 7 is at the end of the first data word. In some implementations, the decoder uses a formula or an equation to determine which clock cycles the decoder receives a data word that includes a prefix.

In another implementation, the decoder initializes a register with a particular value and increments the value by a particular amount after a count of clock cycles is equal to the stored particular value of the register. For example, the decoder can initialize the register with the value of 17 and increment this value by 16 when a counter that counts clock cycles reaches the value of 17. It is noted that in other implementations, the decoder can determine which clock cycles the decoder receives a data word that includes a prefix based on a count of received data words. When a data word is received each clock cycle, then the count of received data words equals the count of clock cycles. However, when a data word is not received during one or more clock cycles, the counts differ in value with the count of clock cycles being greater. In the below description, the decoder maintains a count of clock cycles. However, it is possible and contemplated that the decoder maintains a count of received data words and uses this count to perform the following determinations. It is also possible and contemplated that a different number of data words is received per clock cycle. In such cases, the decoder adjusts the count values when performing the below determinations.

Similarly, even before the decoder receives any data, the decoder determines that data words received in particular clock cycles include a prefix located at a particular offset within the data word. For example, the decoder determines that data words received in clock cycles 17, 81, 145, 209, and so on, include a prefix located at a start of the data word. The offset is zero within the received data word. In an implementation, the decoder can initialize a register (a control and status register, or CSR) with the value of 17 and increment this value by 64 when a counter that counts clock cycles reaches the stored value of 17. The decoder continues these steps for the values 81, 145, and so on. For these particular data words in this implementation, the decoder skips, or prevents, writing data into the buffer of data processing circuitry as the transmitter does not skip sending data in any clock cycle.

Additionally, the decoder determines that data words received in clock cycles 33, 97, 161, 225, and so on, include a prefix located at an offset of 2 within the data word. In an implementation, the decoder can initialize a register (a control and status register, or CSR) with the value of 33 and increment this value by 64 when a counter that counts clock cycles reaches the stored value of 33, and continue these steps for the values 97, 161, and so on. Further, using these steps, the decoder can determine data words received in clock cycles 49, 113, 177, 241, and so on, include a prefix located at an offset of 4 within the data word. The decoder uses the offset to determine sizes of portions of data words to concatenate when generating a data word to send to the buffer of data processing circuitry.

The decoder is also able to process flits. In one example, a large packet uses one or more flits with each flit having a size of 256 bytes. Although it is possible for a flit to include 16 128-bit (16-byte) sections of data, due to 128b/130b encoding, the flit includes 130-bit sections of data and a $16^{th}$ 98-bit section of data (2-bit prefix and 96 bits of data). When processing this flit using the above data sizes, such as the additional 8-bit data words, the decoder skips writing into the buffer of data processing circuitry every 65 clock cycles, or skips writing during 4 clock cycles of the 256 clock cycles required to write the full 256-byte flit. For example, the decoder processes the 256-byte flit during CCs 0 to 255, and the decoder skips writing into the buffer of data processing circuitry during CCs 17, 82, 147 and 212. However, the transmitter sends data to the receiver during each of the CCs 0 to 255, which avoids reducing the effective bandwidth on transmission lines in the presence of clock domain differences between transmitter and receiver. The decoder prevents overflow of the buffer of data processing circuitry as the transmitter sends data to the receiver during each of the CCs 0 to 255.

Figure 4:
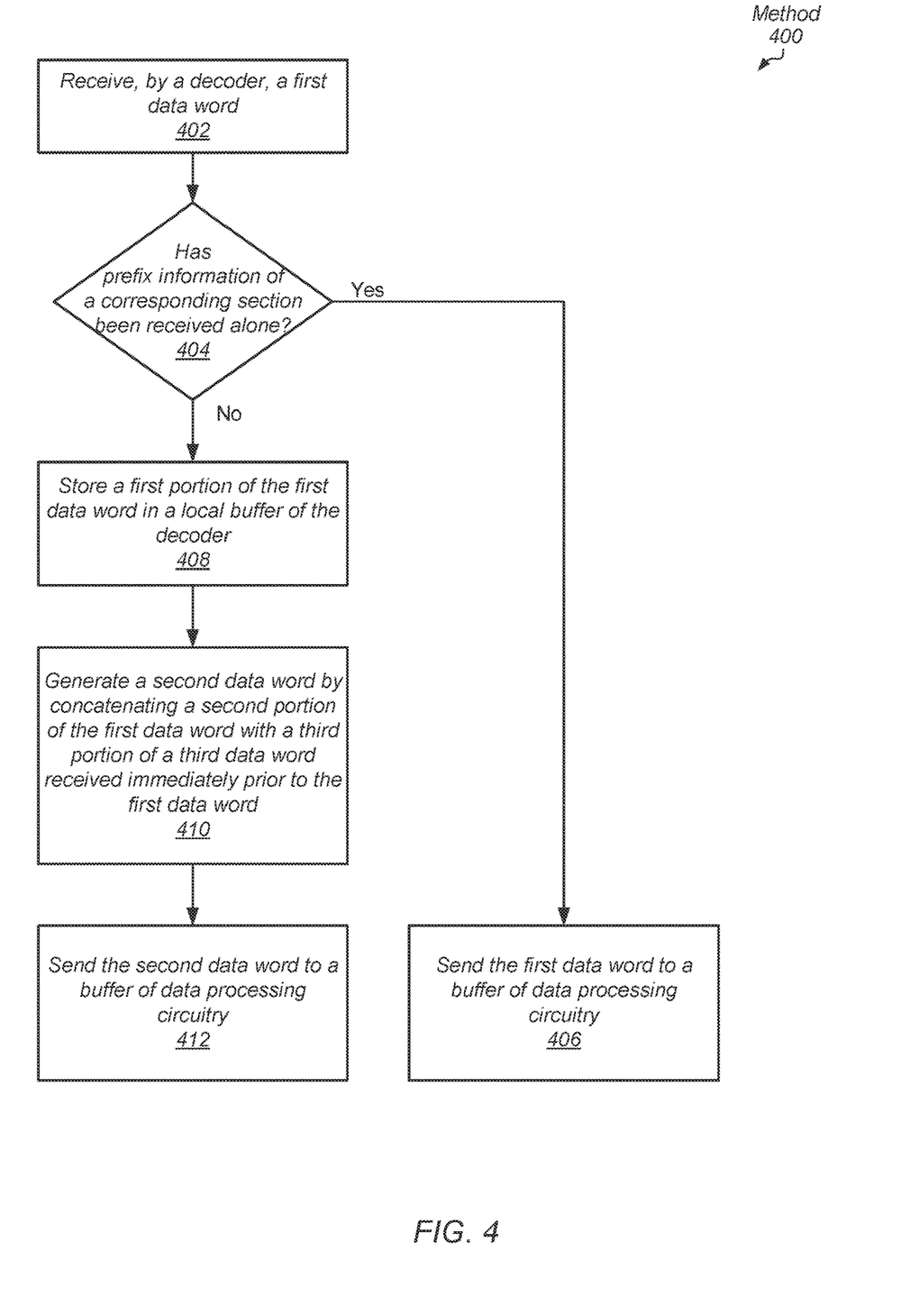
FIG. 4 is a generalized block diagram of a method for avoiding reducing the effective bandwidth on transmission lines in the presence of clock domain differences between transmitter and receiver.

Referring to FIG. 4, a generalized block diagram is shown of a method 400 avoiding reducing the effective bandwidth on transmission lines in the presence of clock domain differences between transmitter and receiver. For purposes of discussion, the steps in this implementation (as well as in FIGS. 5-6) are shown in sequential order. However, in other implementations some steps occur in a different order than shown, some steps are performed concurrently, some steps are combined with other steps, and some steps are absent.

For the description of methods 400-600 (of FIGS. 4-6), a transmitter and a receiver use serial communication. The transmitter sends single-ended data signals to circuitry of a receiver front-end that includes multiple components. Examples of these components are protection and sampling circuitry, deserializer circuitry, a decoder, and a buffer. The serial communication supports one of a variety of encoding techniques that expands (i.e., adds bits to) a section of payload data with prefix information (or a prefix).

Figure 5:
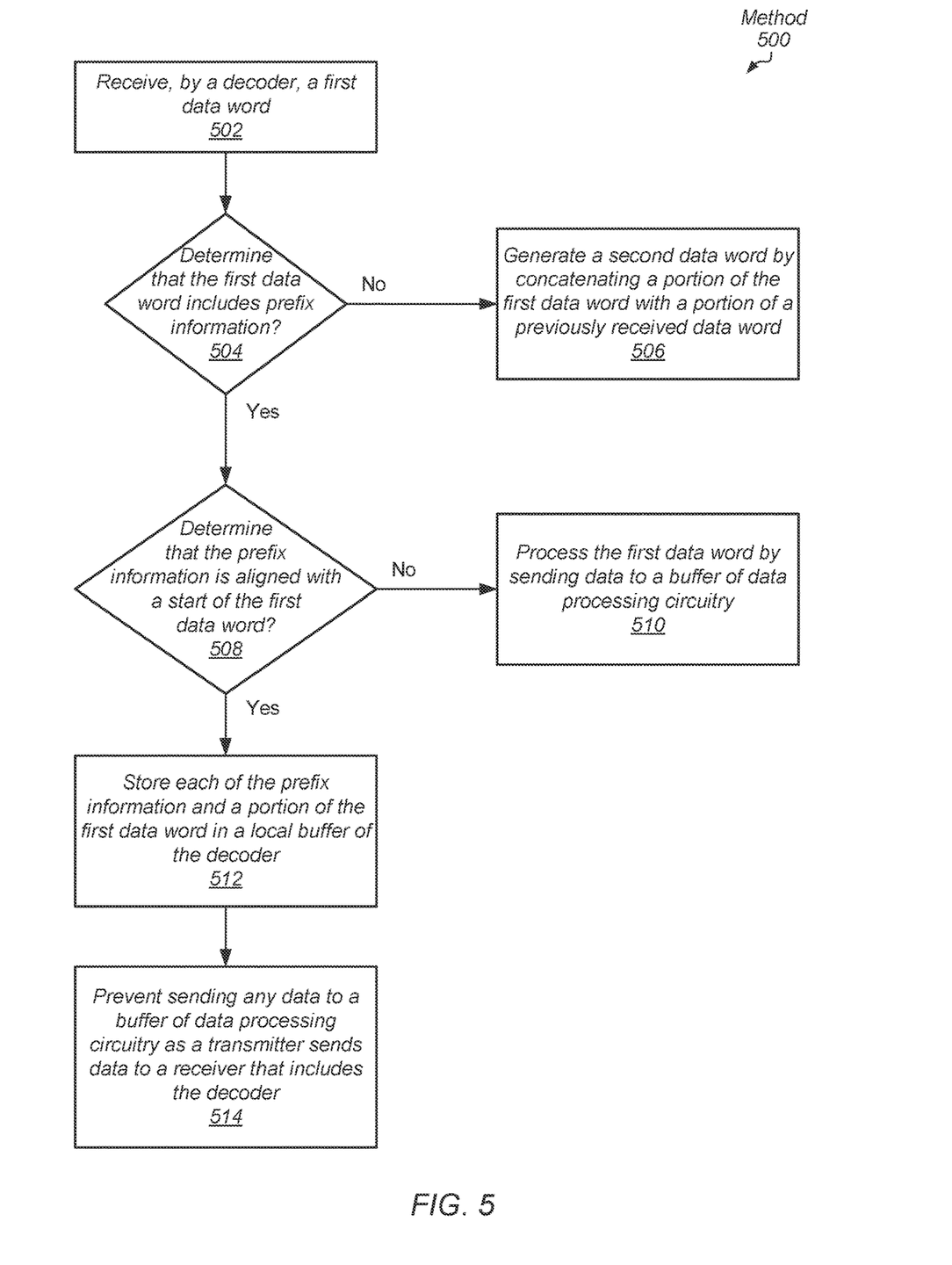
FIG. 5 is a generalized block diagram of a method for avoiding reducing the effective bandwidth on transmission lines in the presence of clock domain differences between transmitter and receiver.
Figure 6:
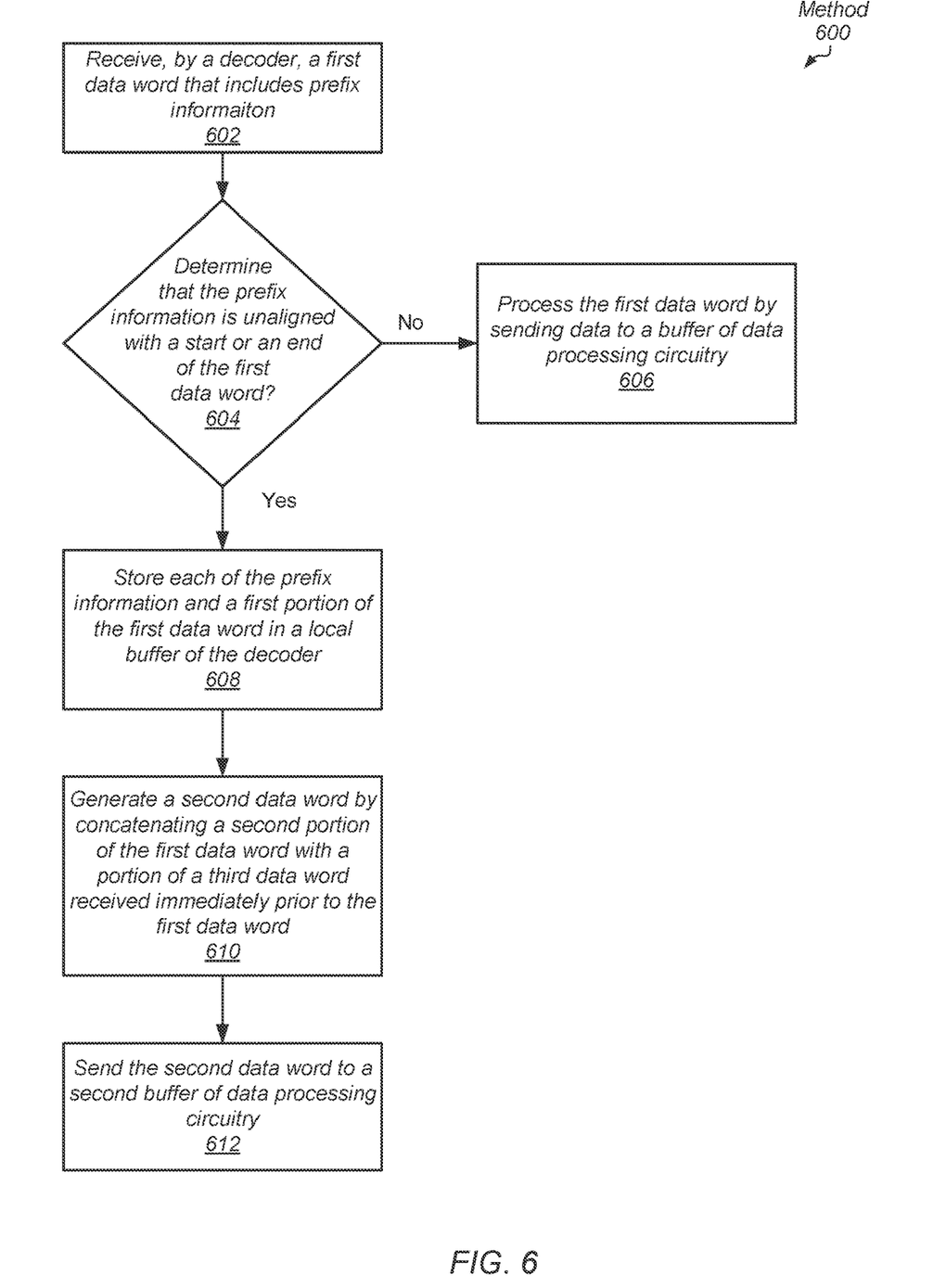
FIG. 6 is a generalized block diagram of a method for avoiding reducing the effective bandwidth on transmission lines in the presence of clock domain differences between transmitter and receiver.

The decoder receives a parallel data word (or data word) from the deserializer circuitry. In an implementation, the serial communication between the transmitter and the receiver supports a 128b/130b encoding technique that expands each 128-bit section of data with a 2-bit prefix. A flow control unit ("flit") is a subset of a larger packet. The flit can have a size of 256 bytes, and flits generally carry data and control information such as header and tail information for the larger packet. The 256-byte flit is divided into 128-bit segments of data that are expanded to 130 bits with the 2-bit prefix. The content of the 128-bit segment can include one or more of payload data, header information, control and status information, reserved information, and so on. The 2-bit prefix indicates the format of fields within the 128-bit segment and the content of these fields.

Additionally, the circuitry of an encoder of the transmitter divides the 128-bit segment of data into 8-bit portions, and the encoder converts (or scrambles or maps) the 8-bit portions of data into data words that represent the 8-bit portions of data. In some implementations, to convert the portions of data into data words, the encoder uses a self-synchronous function such as a linear-feedback shift register (LFSR). The data conversion does not encrypt the data, but rather the data conversion provides a near even distribution of Boolean logic high values and Boolean logic low values being transmitted on the transmission lines. A decoder of the receiver is capable of decoding (remapping or unscrambling or converting) the received data words into the original 8-bit portions of data that were generated earlier by circuitry of the transmitter. Therefore, data processing circuitry of the receiver is capable of processing data generated earlier by circuitry of the transmitter.

A decoder receives a first data word (block 402). If the hardware, such as circuitry of the decoder, determines prefix information (or a prefix) of a section that includes the first data word has been received alone ("yes" branch of the conditional block 404), then the decoder sends the first data word to a buffer of data processing circuitry (block 406). In various implementations, initial transmission of a packet simply includes the prefix. An example of such a transmission was shown earlier in clock cycle (CC) 0 of data flow 300 (of FIG. 3). The subsequent portions of data, such as 8-bit portions, from CC 1 to CC 16 are decoded and sent to the buffer of data processing circuitry.

If the decoder determines a prefix has not been received alone ("no" branch of the conditional block 404), then the decoder stores a first portion of the first data word in a local buffer of the decoder (block 408). A size of the first portion is based on the location of the prefix within an earlier received data word and a size of the prefix. Examples are shown the data flow 300 (of FIG. 3), and a further description of this step is provided in the methods 500-600 (of FIGS. 5-6). The decoder generates a second data word by concatenating a second portion of the first data word with a third portion of a third data word received immediately prior to the first data word (block 410). Again, the size of the second portion is based on the location of the prefix within an earlier received data word and a size of the prefix. The decoder sends the second data word to a buffer of data processing circuitry (block 412).

Turning now to FIG. 5, a generalized block diagram is shown of a method 500 for avoiding reducing the effective bandwidth on transmission lines in the presence of clock domain differences between transmitter and receiver. A decoder receives a first data word (block 502). In various implementations, the decoder includes a counter that counts clock cycles, and the decoder initializes one or more control and status registers (CSRs) that have their stored values compared to the value of the counter. As described earlier regarding the data flow 300 (of FIG. 3), the decoder uses the count of clock cycles and the CSRs to determine which data words include a prefix and an offset of the prefix within a data word. If the hardware, such as circuitry, of the decoder determines that the first data word does not include prefix information (or prefix) ("no" branch of the conditional block 504), then the decoder generates a second data word by concatenating a portion of the first data word with a portion of a previously received data word (block 506).

The sizes of the portions to concatenate are based on placement of prefix information of a corresponding section of data within a previously received data word. In other words, the offset of the prefix within the previously received data word determines the sizes of the portions. This previously received data word with the prefix information can be different than the data word used to generate the second data word. For example, the decoder can perform the steps used in at least CCs 18-32, 34-48, and so on of data flow 300 (of FIG. 3). In various implementations, the decoder sends the generated second data word to a buffer of data processing circuitry.

If the hardware, such as circuitry, of the decoder determines that the first data word includes prefix information ("yes" branch of the conditional block 504), and the decoder determines that the first data word includes prefix information that is unaligned with a start of the first data word ("no" branch of the conditional block 508), then the receiver processes the first data word by sending data to a buffer of data processing circuitry (block 510). A further explanation of these steps is provided in the description of method 600 (of FIG. 6). An additional description is provided for CC 33 of data flow 300 (of FIG. 3).

If the decoder determines that the first data word includes a prefix that is aligned with the start of the first data word ("yes" branch of the conditional block 508), then the decoder stores each of the prefix information and a portion of the first data word in a local buffer of the decoder (block 512). The decoder skips, or prevents, sending any data to a buffer of data processing circuitry as a transmitter sends data to a receiver that includes the decoder (block 514). Therefore, the receiver skips data insertion for this buffer during a clock cycle as the transmitter continues sending data in each clock cycle, which avoids reducing the effective bandwidth on transmission lines in the presence of clock domain differences between transmitter and receiver. An additional description is provided for CC 17 of data flow 300 (of FIG. 3).

Referring to FIG. 6, a generalized block diagram is shown of a method 600 for avoiding reducing the effective bandwidth on transmission lines in the presence of clock domain differences between transmitter and receiver. A decoder receives a first data word that includes prefix information (block 602). In various implementations, the decoder includes a counter that counts clock cycles, and the decoder initializes one or more control and status registers (CSRs) that have their stored values compared to the value of the counter. As described earlier regarding the data flow 300 (of FIG. 3), the decoder uses the count of clock cycles and the CSRs to determine which data words include a prefix and an offset of the prefix within a data word.

If the hardware, such as circuitry of the decoder, determines that the prefix information (or prefix) is aligned with a start or an end of the first data word ("no" branch of the conditional block 604), then the receiver processes the first data word by sending data to a buffer of data processing circuitry (block 606). A further explanation of these steps is provided in the description of methods 400-500 (of FIGS. 4-5). An additional description is provided for CC 17 of data flow 300 (of FIG. 3).

If the decoder determines that the first data word includes a prefix that is unaligned with either the start or an end of the first data word ("yes" branch of the conditional block 604), then the decoder stores each of the prefix information and a first portion of the first data word in a local buffer of the decoder (block 608). When the prefix is unaligned with either the start or an end of the first data word, the entire prefix is in the middle of the first data word. The decoder generates a second data word by concatenating a second portion of the first data word with a portion of a third data word received immediately prior to the first data word (block 610). The decoder sends the second data word to a second buffer of data processing circuitry (block 612).

Figure 7:
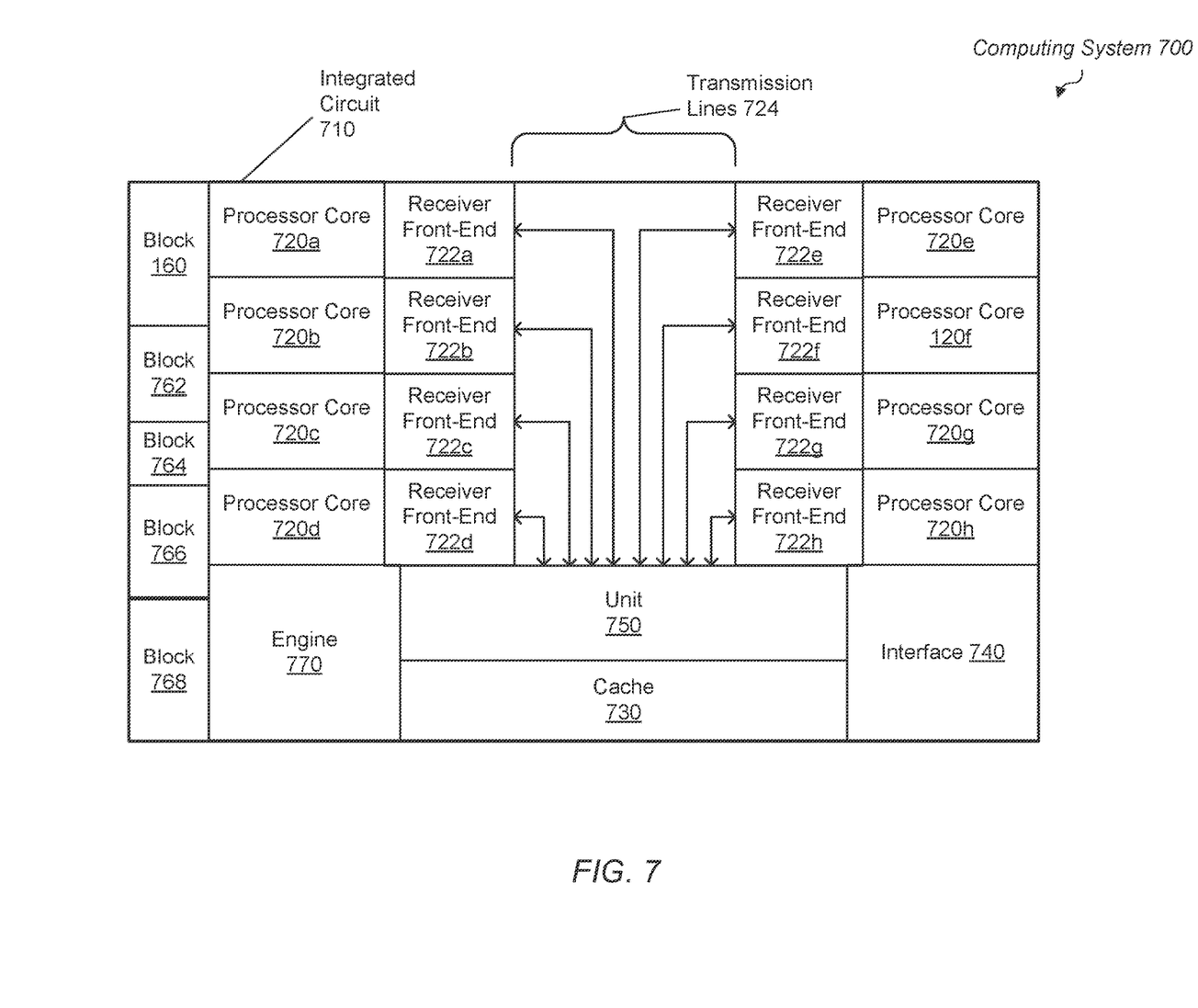
FIG. 7 is a generalized block diagram of a computing system using a communication bus that avoids reducing the effective bandwidth on transmission lines in the presence of clock domain differences between transmitter and receiver.

Turning now to FIG. 7, a generalized block diagram is shown of a computing system 700 using a communication bus that avoids reducing the effective bandwidth on transmission lines in the presence of clock domain differences between transmitter and receiver. The integrated circuit 710 includes processor cores 720a-720h, cache 730, interface 740, unit 750, functional blocks 760-768, and engine 770. The processor cores 720a-720h use receiver front-end blocks 722a-722h for communicating with unit 750. The integrated circuit 710 includes multiple types of designs providing a variety of functionalities. In some implementations, the integrated computing system 700 is a system on a chip (SoC) that includes a variety of processing units and functional blocks providing a variety of functionalities. In an implementation, cache 730, interface 740, unit 750, functional blocks 760-768, and engine 770 provide separate functionality. In contrast, each of processor cores 720a-720h provides a same functionality. For example, in some designs, each of processor cores 720a-720h is an instantiation of a same processor core. It is also possible and contemplated that two or more of the functional blocks 760-768 provide a same functionality.

In some implementations, the integrated circuit 710 includes a central processing unit (CPU) with circuitry used for processing instructions of a selected instruction set architecture (ISA), a graphics processing unit (GPU) with circuitry that implements a high parallel data microarchitecture, a Hub used for communicating with multimedia engine, and a multimedia engine, such as engine 770, with circuitry that processes audio data and visual data for multimedia applications. In another implementation, the unit 750 and the functional blocks 760-768 include one or more application specific integrated circuits (ASICs) or microcontrollers, one or more digital signal processors (DSPs), analog-to-digital converters (ADCs), and digital-to-analog converters (DACs).

In an implementation, a communication fabric supports communication between the components of the integrated circuit 710. The communication fabric supports the transfer of messages, requests, responses, acknowledgments, commands, interrupts, and so forth between the multiple components within the integrated circuit 710 and one or more external processing units and peripheral devices. In various implementations, the communication among components of the integrated circuit 710 includes at least the transmission lines 724 between the unit 750 and the processor cores 720a-720h, each using a corresponding one of the receiver front-end blocks 722a-722h. In various implementations, each of the receiver front-end blocks 722a-722h utilizes an implementation such as the receiver front-end 200 (of FIG. 2) and supports a data flow such as data flow 300 (of FIG. 3).

As shown, the transmission lines 724 have varying metal trace lengths based on an on-die location of a corresponding one of the processor cores 720a-720h. Therefore, the impedance of the transmission lines 724 vary among one another. In addition to the varying metal trace lengths, in some implementations, the metal traces of the transmission lines 724 also vary among metal layer thicknesses and spacings between metal traces. In some implementations, based on an impedance of a corresponding one of the transmission lines 724, one or more of the receiver front-end blocks 722a-722h adjust one or more of a size of a prefix inserted in data transmission, a size of sections of data with each section having a corresponding prefix, a size of data words used within the sections of data, and a size of buffer entries of a buffer that receives prefixes and data words.

The circuitry of the interface 740 communicates with one of an external memory, an external peripheral device, another semiconductor chip, or other. The interface 740 includes queues for storing requests and responses as well as circuitry for supporting a particular communication protocol. Although a single interface is shown, it is possible and contemplated that the integrated circuit 710 uses multiple interfaces. In various implementations, the multiple components of the integrated circuit 710 supports a cache memory subsystem that includes integrated caches as well as external caches such as the shared cache 730.

Figure 8:
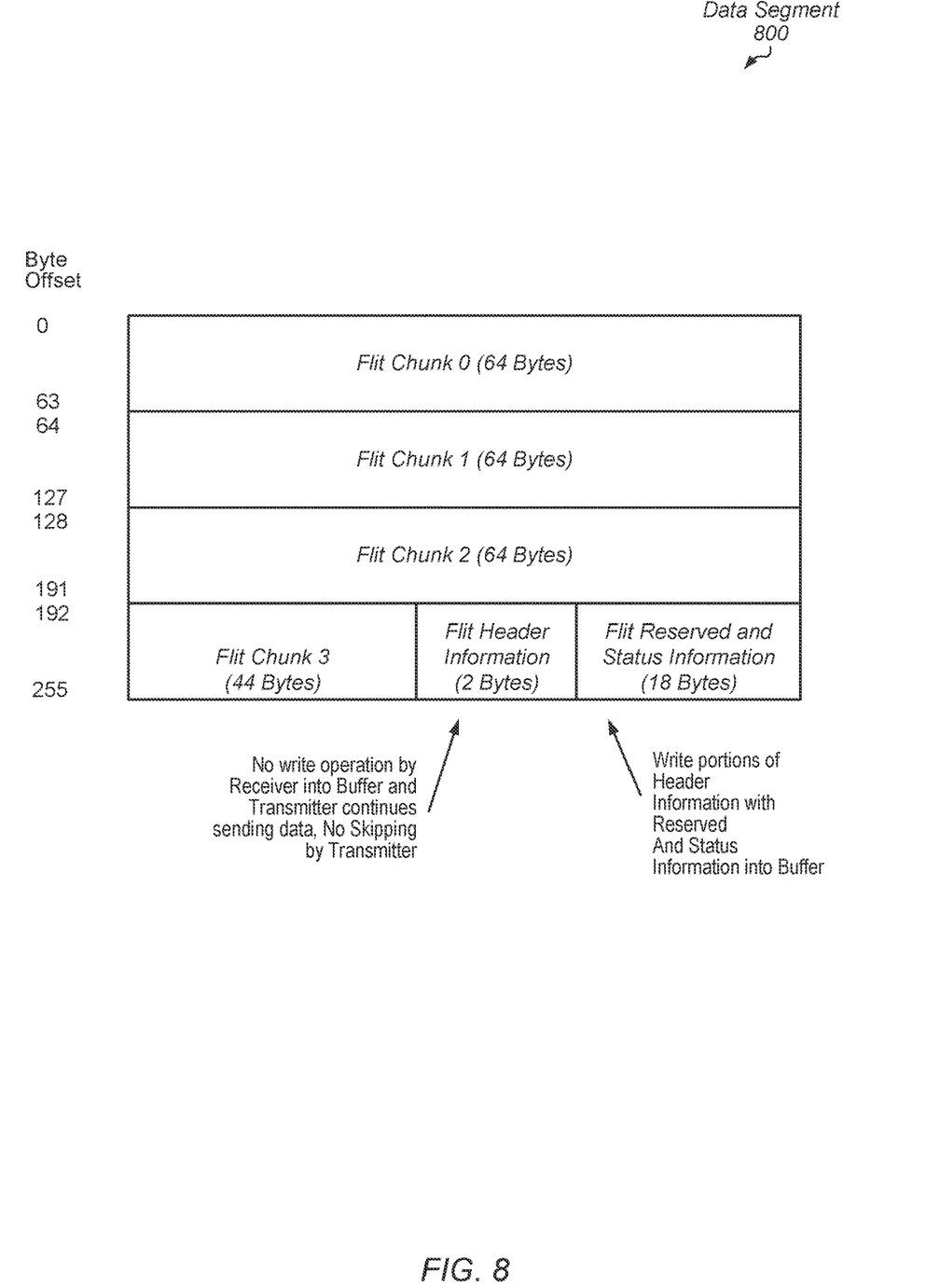
FIG. 8 is a generalized block diagram of a data segment.

Referring to FIG. 8, a generalized block diagram is shown of a data segment 800. As shown in the illustrated implementation, the data segment 800 includes multiple chunks with header information in one of the chunks. In some implementations, the data segment 800 is a portion of a larger packet. For example, the data segment 800 is a flow control unit ("flit"). A flit is a subset of the larger packet. Flits generally carry data and control information such as header and tail information for the larger packet. Although in some implementations, data for transmission includes routing packets in a network, in other implementations, the data for transmission is a bit stream or a byte stream in a point-to-point interconnection.

As shown, the data segment 800 includes 256 bytes of information with four data chunks of 64 bytes each. Flit chunk 0 includes bytes 0 to 63 of payload data of the flit, flit chunk 1 includes bytes 64-127 of payload data of the flit, flit chunk 2 includes bytes 128-191 of payload data of the flit, and flit chunk 3 includes bytes 192-235 (or 44 bytes) of payload data of the flit. Flit chunk 3 also includes 2 bytes of header information and 18 bytes of reserved and status information. The header information stores information identifying at least the source which generated the packet and the destination which intends to use the payload of the packet for processing an application. The header information is used by routers, switches, and bus drivers to transmit the packet from the source to the destination. In some implementations, the reserved and status information includes cyclic redundancy check (CRC) error information.

In some implementations, a decoder of a receiver is aware of the byte offset of the header information within the data segment 800. The decoder does not immediately store the header information in a buffer read by data processing circuitry of a receiver. Rather, the decoder temporarily stores the entire size of the header information in a local buffer. Afterward, the decoder selects a size of a portion of the header information to write to the buffer of the data processing circuitry. For example, the decoder inserts 2 bits of the 2-bytes of the header information in each in the buffer in each subsequent clock cycle. Therefore, in this implementation, the decoder consumes 8 clock cycles to write the entire header information in the buffer. To do so, in various implementations, the decoder uses the components described in the description of the receiver front-end (of FIG. 2), and the steps described in the description of the data flow 300 (of FIG. 3), and the methods 400-600 (of FIGS. 4-6).

It is noted that one or more of the above-described implementations include software. In such implementations, the program instructions that implement the methods and/or mechanisms are conveyed or stored on a computer readable medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage. Generally speaking, a computer accessible storage medium includes any storage media accessible by a computer during use to provide instructions and/or data to the computer. For example, a computer accessible storage medium includes storage media such as magnetic or optical media, e.g., disk (fixed or removable), tape, CD-ROM, or DVD-ROM, CD-R, CD-RW, DVD-R, DVD-RW, or Blu-Ray. Storage media further includes volatile or non-volatile memory media such as RAM (e.g., synchronous dynamic RAM (SDRAM), double data rate (DDR, DDR2, DDR3, etc.) SDRAM, low-power DDR (LPDDR2, etc.) SDRAM, Rambus DRAM (RDRAM), static RAM (SRAM), etc.), ROM, Flash memory, non-volatile memory (e.g., Flash memory) accessible via a peripheral interface such as the Universal Serial Bus (USB) interface, etc. Storage media includes microelectromechanical systems (MEMS), as well as storage media accessible via a communication medium such as a network and/or a wireless link.

Additionally, in various implementations, program instructions include behavioral-level descriptions or register-transfer level (RTL) descriptions of the hardware functionality in a high-level programming language such as C, or a design language (HDL) such as Verilog, VHDL, or database format such as GDS II stream format (GDSII). In some cases, the description is read by a synthesis tool, which synthesizes the description to produce a netlist including a list of gates from a synthesis library. The netlist includes a set of gates, which also represent the functionality of the hardware including the system. The netlist is then placed and routed to produce a data set describing geometric shapes to be applied to masks. The masks are then used in various semiconductor fabrication steps to produce a semiconductor circuit or circuits corresponding to the system. Alternatively, the instructions on the computer accessible storage medium are the netlist (with or without the synthesis library) or the data set, as desired. Additionally, the instructions are utilized for purposes of emulation by a hardware-based type emulator from such vendors as Cadence®, EVE®, and Mentor Graphics®.

Although the implementations above have been described in considerable detail, numerous variations and modifications will become apparent to those skilled in the art once the above disclosure is fully appreciated. It is intended that the following claims be interpreted to embrace all such variations and modifications.

What is claimed is:

1. An integrated circuit comprising:
control circuitry; and
wherein the control circuitry is configured to:
receive a first data word of a first section of one or more sections, each section divided into a plurality of data words, and each section comprising prefix information followed by payload data;
skip writing received data into a first buffer of data processing circuitry, based at least in part on a count of received data words meeting a first condition; and
in response to determining received data is to be written into the first buffer, send a second data word to the first buffer, wherein the second data word comprises data of the first data word and a third data word of the first section different from the first data word.

2. The integrated circuit as recited in claim 1, wherein the control circuitry is further configured to:
receive the third data word of the first section after the first data word; and
in response to the third data word does not include prefix information, generate the second data word by concatenating a portion of the first data word with a portion of the third data word.

3. The integrated circuit as recited in claim 2, wherein a size of the first data word is equal to a size of each of the second data word and the third data word.

4. The integrated circuit as recited in claim 1, wherein based on the count of received data words, the control circuitry is further configured to determine:
when a given data word that comprises prefix information is received; and
a bit offset within the given data word that includes a start of the prefix information.

5. The integrated circuit as recited in claim 1, wherein in response to the first data word comprises prefix information of the first section, the control circuitry is further configured to send the prefix information with the second data word to the first buffer of data processing circuitry.

6. The integrated circuit as recited in claim 5, wherein in response to a starting end of the first data word includes the prefix information, the control circuitry is further configured to:
store the prefix information in a second buffer different from the first buffer of data processing circuitry;
store a portion of the first data word in the second buffer; and
skip writing any data to the first buffer of data processing circuitry.

7. The integrated circuit as recited in claim 5, wherein in response to the first data word comprises the prefix information unaligned with either end of the first data word, the control circuitry is further configured to:
store the prefix information in a second buffer different from the first buffer of data processing circuitry;

store a portion of the first data word in the second buffer; and send data of a second section different from the first section from the second buffer to the first buffer of data processing circuitry.

8. A method comprising:

receiving, by a decoder, a first data word of a first section of one or more sections;

determining, by a decoder based on a count of received data words, when to skip writing received data into a first buffer of data processing circuitry; and in response to determining to write received data into the first buffer, sending, by the decoder, a second data word to the first buffer, wherein the second data word comprises data of the first data word and a third data word of the first section different from the first data word.

9. The method as recited in claim 8, further comprising:

receiving, by the decoder, the third data word of the first section after the first data word; and in response to the third data word does not include prefix information, generating, by the decoder, the second data word by concatenating a portion of the first data word with a portion of the third data word.

10. The method as recited in claim 9, wherein a size of the first data word is equal to a size of each of the second data word and the third data word.

11. The method as recited in claim 8, wherein based on the count of received data words, the method further comprises determining by the decoder:

when a given data word that comprises prefix information is received; and a bit offset within the given data word that includes a start of the prefix information.

12. The method as recited in claim 8, wherein in response to the first data word comprises prefix information of the first section, the method further comprises sending, by the decoder, the prefix information with the second data word to the first buffer of data processing circuitry.

13. The method as recited in claim 12, wherein in response to a starting end of the first data word includes the prefix information, the method further comprises:

storing, by the decoder, the prefix information in a second buffer different from the first buffer of data processing circuitry;

storing, by the decoder, a portion of the first data word in the second buffer; and skipping writing, by the decoder, any data to the first buffer of data processing circuitry.

14. The method as recited in claim 12, wherein in response to the first data word comprises the prefix information unaligned with either end of the first data word, the method further comprises:

storing, by the decoder, the prefix information in a second buffer different from the first buffer of data processing circuitry;

storing, by the decoder, a portion of the first data word in the second buffer; and sending, by the decoder, data of a second section different from the first section from the second buffer to the first buffer of data processing circuitry.

15. An apparatus comprising:

deserializer circuitry configured to receive, from sampling circuitry, one or more sections, each section divided into a plurality of data words, and each section comprising prefix information followed by payload data; and a decoder; and wherein the decoder comprises:

control circuitry; and wherein the control circuitry is configured to:

receive a first data word of a first section of one or more sections, each section divided into a plurality of data words, and each section comprising prefix information followed by payload data;

determine, based on a count of received data words, when to skip writing received data into a first buffer of data processing circuitry; and in response to determining to write received data into the first buffer, send a second data word to the first buffer, wherein the second data word comprises data of the first data word and a third data word of the first section different from the first data word.

16. The apparatus as recited in claim 15, wherein the control circuitry is further configured to:

receive the third data word of the first section after the first data word; and in response to the third data word does not include prefix information, generate the second data word by concatenating a portion of the first data word with a portion of the third data word.

17. The apparatus as recited in claim 16, wherein a size of the first data word is equal to a size of each of the second data word and the third data word.

18. The apparatus as recited in claim 15, wherein based on the count of received data words, the control circuitry is further configured to determine:

when a given data word that comprises prefix information is received; and a bit offset within the given data word that includes a start of the prefix information.

19. The apparatus as recited in claim 15, wherein in response to the first data word comprises prefix information of the first section, the control circuitry is further configured to send the prefix information with the second data word to the first buffer of data processing circuitry.

20. The apparatus as recited in claim 19, wherein in response to a starting end of the first data word includes the prefix information, the control circuitry is further configured to:

store the prefix information in a second buffer different from the first buffer of data processing circuitry;

store a portion of the first data word in the second buffer; and skip writing any data to the first buffer of data processing circuitry.

* * * * *